United States Patent [19]

Kress et al.

[11] Patent Number: 5,074,721
[45] Date of Patent: Dec. 24, 1991

[54] METAL CUTTING BLADE AND PROCESS FOR MANUFACTURE THEREOF

[75] Inventors: Dieter Kress, Aalen; Friedrich Häberle, Lauchheim, both of Fed. Rep. of Germany

[73] Assignee: Mapal Fabrik für Präzisionswerkzeuge Dr. Kress KG, Aalen, Fed. Rep. of Germany

[21] Appl. No.: 506,527

[22] Filed: Apr. 4, 1990

Related U.S. Application Data

[63] Continuation of Ser. No. 199,133, May 26, 1988, abandoned, which is a continuation-in-part of Ser. No. 604,814, Apr. 27, 1984, abandoned, which is a continuation-in-part of Ser. No. 269,705, Jun. 2, 1981, abandoned.

[30] Foreign Application Priority Data

Jun. 30, 1980 [DE] Fed. Rep. of Germany ....... 3020929

[51] Int. Cl.$^5$ ............................................. B23P 15/28
[52] U.S. Cl. .................................................. 407/119
[58] Field of Search ................. 407/119, 34, 61, 53 X, 407/33, 54, 113 X, 57; 408/153

[56] References Cited

U.S. PATENT DOCUMENTS

| | | |
|---|---|---|
| 2,244,053 | 6/1941 | Comstock . |
| 3,064,349 | 11/1962 | Futterer et al. . |
| 3,369,283 | 2/1968 | Colding . |
| 3,387,368 | 6/1968 | Scheck . |
| 3,974,564 | 8/1976 | Hough . |
| 4,086,733 | 5/1978 | Vig ........................................ 407/61 |
| 4,159,884 | 7/1979 | Schott . |
| 4,643,620 | 2/1987 | Fujii et al. ........................... 407/119 |
| 4,669,923 | 6/1987 | McKinney ........................... 407/34 |

OTHER PUBLICATIONS

Article from "American Machinist", Mar. 1983.
Article from "American Machinist", Jul. 1979.

*Primary Examiner*—Frederick R. Schmidt
*Assistant Examiner*—Lawrence Cruz
*Attorney, Agent, or Firm*—Toren, McGeady & Associates

[57] ABSTRACT

A hard metal cutting blade comprises a blade body having front and rear faces. The blade body is meant for engagement to a tool head and for rotation about a rotation axis. The blade is moved in a feed direction for the fine machining of bores that extend parallel to the rotation axis. The front face of the blade includes a recessed chip face which defines a cutting edge that has a main blade that is followed by a secondary blade. The main blade is divided into two regions, a first region that is almost flush or slightly inclined with respect to the secondary blade, and a second region which inclines at a greater angle and is spaced further from the secondary blade. An abrasion-resistant hard material coats the blade body. This material is ground away from the chip face, at least in the area of the secondary blade, to provide a radius of no more than 5 μm for the edge of the secondary blade.

13 Claims, 2 Drawing Sheets

METAL CUTTING BLADE AND PROCESS FOR MANUFACTURE THEREOF

This is a continuation of application Ser. No. 07/199,133 filed May 26, 1988, which itself is a continuation-in-part of application Ser. No. 06/604,814 filed Apr. 27, 1984, which in turn is a continuation of Ser. No. 06/269,705 filed June 2, 1981.

The invention is directed to a hard metal cutting blade coated with wear-resistant hard material for machining tools or tool bits, which is detachably insertable into a slot of a tool head or which can be clamped into same. The tools have main as well as a secondary blade, with an associated chip face or true rake and an adjacent free face or side rake. The invention also includes a method for manufacture of the tools.

It is known to coat cutting edges of machining tools which consist of hard metal or hardened high-speed steel, with a thin layer of wear-resistant hard material, for instance titanium nitride, in order to be able to increase the machining speed and diminish the wear of the cutting edge. Such machining tools coated in such manner and having an increased service life are however only utilized for high machining outputs and for comparatively large cutting depths, as they are required during machining on a lathe or milling. Such coatings are known from the JP-OS 48-58 470 and 53 83 177 for cutting blades from hardened high-speed steel, which serve for rough machining. It is essential herein that the useful life of the cutting blades is increased by the coating. The cutting edges, however, tend to chip because of the coating, which again reduces the useful life. The chipping of the cutting edges is caused by the differing coefficients of expansion of the basic material of the cutter and the coating material. This causes thermal stresses, which are avoided by a targeted grinding-off of the coating. An essential quality required in rough machining is thus the heat resistance of the cutter blade. Contrary to the foregoing, the cutting blades for finish-machining are subject to other wear phenomena. In such a cutting blade the wear at the free flank or side rake is decisive for the useful life.

An essential difference is also the cutting edge radius which, in the case of fine or finish-machining, amounts to approximately 5 μm. Such radii are unusable in rough machining such as described in the Japanese disclosure publications, because they cannot resist the stresses which arise in such circumstances. Therefore radii of approximately 30 μm are used there.

The different cutting edge radii are based on the different stresses occurring while cutting during rough machining or finish-machining operations. In the rough or heavy machining, a cutting depth of approximately 2 mm and a feed of the cutting edge against the workpiece to be machined of approximately 0.4 mm per revolution are usual, while in the case of finish-machining for instance, a cutting depth of approximately 0.1 mm and a feed of 0.2 mm per revolution are selected.

SUMMARY OF THE INVENTION

The invention is based upon the task of applying the advantages of coated cutting blades also to finish machining of bores.

It is also the aim of the invention to make use of the fact that the cutting edge is subjected to different stresses during a machining operation. The cutting depth is smallest in the region of the secondary blade. Here essentially scuffing stresses occur. The radius of the cutting edge is to be as small as possible in this case and preferably it should amount to less than 5 μm. In regions of deeper cutting depths, thus in the region of the main blade the radius of the cutting edge can have a considerably higher value.

This problem is solved in a hard metal cutting blade in accordance with the invention 1 in that, in a cutting blade which serves exclusively for finish machining of bores, the main cutting blade lies practically flush or in alignment with the secondary blade, wherein the secondary blade is arranged practically parallel to the wall of the bore which is to be worked, and in that the hard material layer or coating is removed from the chip face or true rake at least in the region of the secondary blade, so that the radius of the cutting edge at the transition from the chip face of the secondary blade, from which the coating has been removed, to the side rake of the secondary blade is approximately equal to or less than 5 μm. The first region of the main blade directly adjacent to the secondary blade has also a shallow angle of inclination with respect to the wall of the bore to be worked of approximately 3° in direction of the feed of the machining tool equipped with the cutting blade; this first region of the main blade is directly adjacent to the secondary blade.

A process for manufacture of a hard metal cutting blade for machining tools of the above-mentioned type serves also towards the solution of this task, which blade serves exclusively for the finish-machining of bores and whose main blade transits practically flush into the secondary blade, wherein the hard metal coating is applied by chemical vapor deposition (CVD). Subsequently in an additional stage of the process the coating is ground off from the chip face of the cutting blade at least in the region of the secondary blade, so that the cutting edge radius of approximately 5 μm results in the region of the secondary blade.

Additional advantages and refinements of the cutting blade and of the process are achieved by other features of the invention. An embodiment is particularly preferred in which the foremost region of the main blade, viewed in feed direction of the tool, encloses an angle of inclination of approximately 4° with the rear side or the front side of the cutting blade.

Because this region of the cutting blade is recessed with respect to the chip face of the secondary blade and the chip face of the region of the main blade adjacent to the secondary blade, the hard material coating is not affected here during the grind-off operation. This avoids a wear of this region in a particularly efficient manner.

BRIEF DESCRIPTION OF THE DRAWING

The invention is described with particularity in the following with the help of the drawings. It is shown on.

DESCRIPTION OF THE PREFERRED EMBODIMENTS

Figure 1:
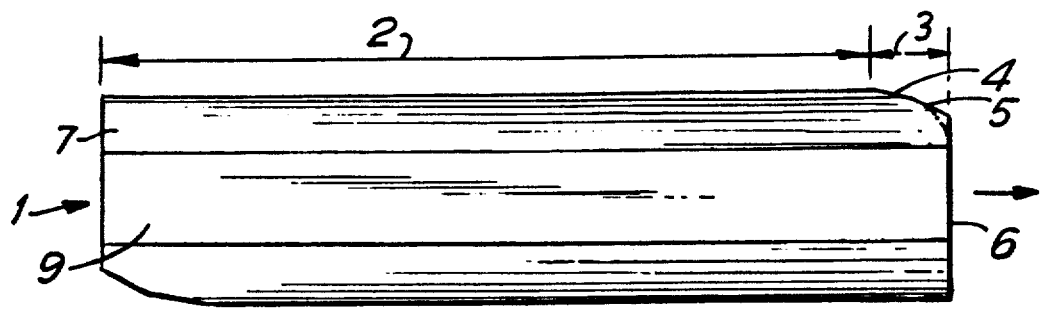
FIG. 1 a side view of the cutting blade.

It is evident from FIG. 1 that the cutting blade is designed so as to be symmetrical point for point, meaning it can be utilized as a reversible blade. It is inserted into a machine tool in such a way that its top boundary in the figure, the cutting edge, comes into engagement with the wall of the bore.

The top edge of the cutting blade 1 depicted in FIG. 1 has two principal regions:

One secondary blade 2 and one main blade 3, which main blade is divided into two regions which both taper off in the feed direction marked by an arrow. The first region 4 of the main blade 3 directly adjacent to the secondary blade has an angle of inclination of approximately 3° with respect to the horizontal. The adjacent thereon second region 5 of the main blade 3 has an angle of inclination of 15° to 30°. The second region 5 of the main blade is rounded off in its transition region to the front end 6 of the cutting blade 1. This rounding off is however not mandatory. It can also be left off. Therefore it is shown in FIGS. 1 and 2 in broken lines.

Figure 3:
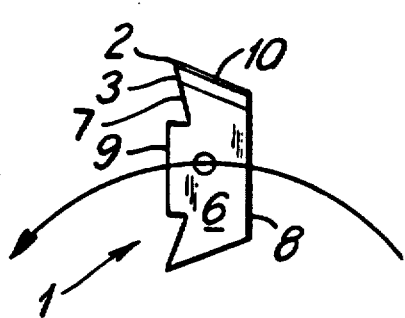
FIG. 3 a front view of the cutting blade.
Figure 4:
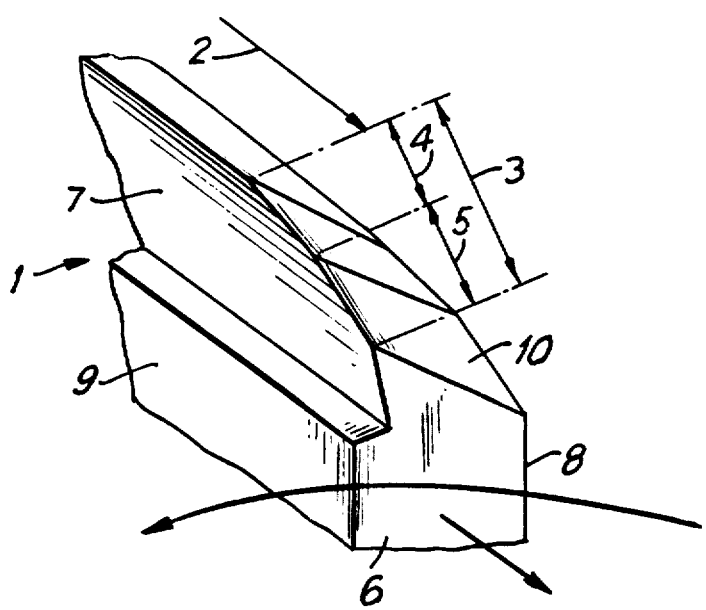
FIG. 4 a view of the cutting blade in perspective.

As can be seen also in FIGS. 3 and 4, the chip face or true rake 7 links up with the secondary blade 2 and the main blade 3 on the front side of the cutting blade 1. It is inclined with respect to the rear side of the cutting blade .which is standing perpendicular in FIG. 3, whereby it lies closer to the cutter rear side 8 in its lower region. Below the chip face 7 lies the cutter front 9, against which a clamping lug (not shown) rests, in order to clamp the cutter plate in the base member of a chucking tool, wherein the rear side 8 of the cutting blade rests at the basic member of the clamping chuck.

It can be discerned from FIG. 3 that the cutter face 9 and the rear side 8 of the cutting blade 1 extend essentially parallel to each other and stand practically at right angles upon the axis of rotation of the machining tool which is not depicted here. The machining tool carrying the cutting blade 1 moves from left to right in FIG. 1 and in FIG. 3 out of the plane of the paper upwards. According to FIG. 3 the direction of rotation of the machining tool is counterclockwise.

Figure 2:
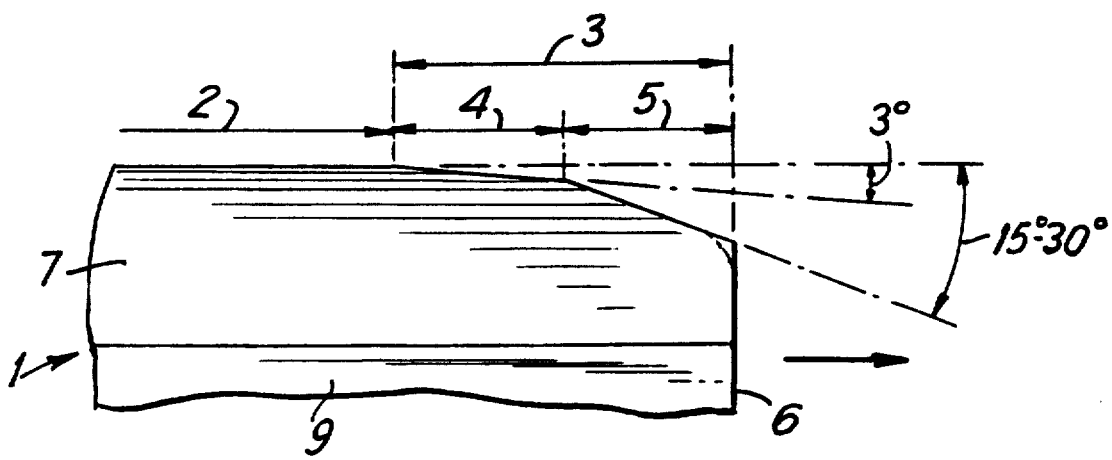
FIG. 2 a partial magnification of the cutting blade.

FIG. 2 depicts the main blade 3 and a portion of the secondary blade 2. The secondary blade 2 tapers from right to left from the transition region between the main 3 and the secondary blade 2 by 1 $\mu$m per mm, it thus extends practically parallel to the bore to be machined. While thus the main blade 3 has two regions 4 and 5 inclined in feed direction, the secondary blade 2 is inclined in opposite direction. It is clearly visible from FIG. 2, that the secondary blade 2 transits essentially flush into the main blade 3.

The perspective view in FIG. 4 shows once more the front portion of the cutting blade 1 at a larger scale. Apart from the secondary blade 2 the main blade 3 with its two regions 4 and 5 is again visible, which are inclined at different angles of inclination in direction of the feed which is represented by an arrow. The chip face 7 connects to the cutting edges, which chip face transits into the cutter front 9. It is recognizable in FIGS. 3 and 4 that a side rake 10 is respectively adjacent to the main—and secondary blade, which side rake tapers in direction towards the rear side 8 of the cutting blade 1.

Figure 5:
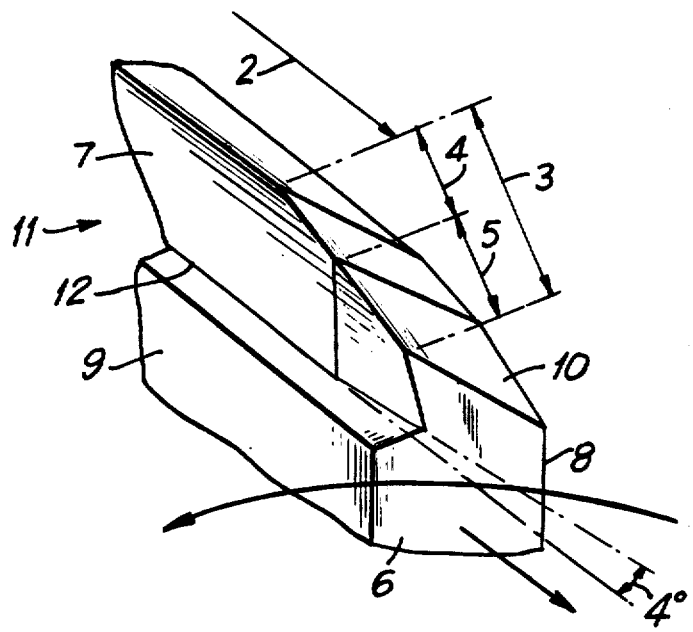
FIG. 5 an additional embodiment of the cutting blade in perspective view view.
Figure 6:
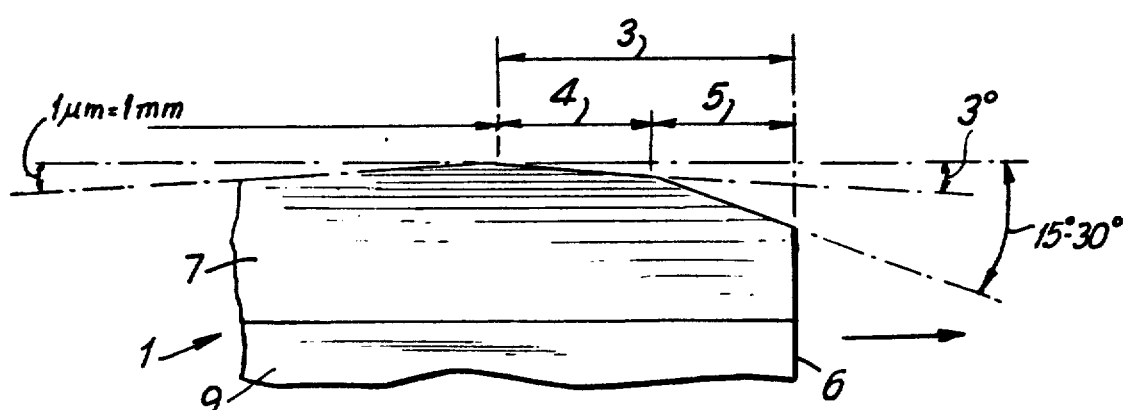
FIG. 6 illustrates the tapering of the secondary blade.

FIG. 5 shows another embodiment of the cutting blade 11, wherein the same parts have been given the same reference numbers. It can be discerned from the diagram that the boundary line 12 of the chip face 7 facing away from the main blade shifts in direction to the rear side 8 of the cutting blade 11 in the region of the main blade as well as as shown in FIG. 6, the main blade itself. Here an angle of inclination of approximately 4° is provided, by means of which a so-called curling cut is obtained. For the rest of it, the cutting blade shown in FIG. 5 corresponds to the first embodiment in FIGS. 1 to 4. It can be seen very well from this drawing, that the chip face of the receding region 5 of the main blade 3 remains untouched during a grinding process, this means that the hard material coating remains whole in this region.

Having presented the geometric conditions the coating of the cutting blades 1 and 11 will be described in the following in more detail. The cutting blades consist of hard metal. They are coated with an abrasion-resisting hard material preferably titanium nitride. The coating is accomplished by a chemical process, the chemical vapor deposit coating process. The abbreviation CVD stands for chemical vapor deposition. This process is performed at a temperature of 1050° C. This alone demonstrates that this process cannot be used for heat treated steel, because at these temperatures the steel would lose its strength. For such materials the so-called physical coating process the PVD process is solely suited, wherein PVD stands for physical vapor deposition. This process is performed at a temperature of 400° C., this a temperature which does not affect the properties of heat-treated steel.

The cutting edges of the main—and secondary blade 2 and 3 of the cutting blade 1 or 11 are rounded off before the coating process, whereby a cutting edge radius of 50 to 70 $\mu$m results. The hard material layer deposited by the CVD process has a thickness of approximately 7 $\mu$m. After the coating process the cutting blade 1 or 11 is covered by a continuous layer of hard material. In order to attain a cutting edge radius approximately equal to or less than 5 $\mu$m the cutting blade I is ground off at least in the region of the chip face 7 of the secondary blade 2. Through this there results an inclined chip face 7 which can be seen particularly well in FIGS. 3, 4 and 5. During the grinding-off process of the chip face, a layer approximately 50 $\mu$m thick is removed, whereby a cutting edge radius of equal to or less than 5 $\mu$m results in the region of the secondary blade. If the chip face in the adjacent region 4 of the main blade 3 is also ground off, then there results also here a cutting edge radius of approximately equal to or less than 5 $\mu$m.

This method of the overall coating of the cutting blade has shown good results because a partial coating of the cutting blade can be performed only with difficulties. Especially the desired small cutting edge radius cannot be achieved with the CVD process also when using the partial coating method, because this method entails a rounding off of the existing edges.

While the secondary blade 2 and the first region 4 of the main blade 3 are essentially subjected to a wear by scuffing or abrasion, one is dealing in the second region 5 of the main blade with scoring wear. Because of these differing wear phenomena of the cutting edge regions preferably only the chip face in the region of the secondary blade or however in the region of the secondary blade 2 and the directly adjacent first region 4 of the main blade 3 is subjected to a removal of the coating by a grinding process. In this process the second region 5 of the main blade 3 remains completely coated with hard material. Thus this region is particularly well protected against wear. In such cases when scoring wear is not particularly great, the chip face of the secondary blade 2 as well as of the entire main blade 3 can be subjected to removal of the hard material coating.

It results from the above statement that the cutter front 9 as well as the rear side 8 of the cutting blade 1 or 11 as well as the side rakes of the main—and secondary blade remain coated with hard material during the grinding-off process of the hard material layer.

Because of the centrical design of the cutting blade 1 or 11 constructed as a reversible blade, what has been stated for the upper half of the cutting blade in FIG. 1 applies also to its lower half. When the upper main—and secondary blade of the cutting blade is worn down, said blade can be reversed, so that the cutting edge which has so far not been used comes into engagement with the wall of the bore.

We claim:

1. A hard metal cutting blade for machining tools which is coated with abrasion-resistant hard material, and which is detachably attached to a tool head, comprising a main and a secondary blade respectively with an assigned chip face and an adjacent side rake, wherein the cutting blade (1) is provided exclusively for the finish machining of bores and wherein the transition from the main blade (3) into the secondary blade (2) is essentially flush, the secondary blade (2) being inclined counter to the feed direction of the cutting blade (1) and tapering by approximately one μm per 1 mm, the hard material coating being removed from the chip face (7) in the region of the secondary blade (2), so that the cutting edge radius at the transition of the chip face (7) of the secondary blade (2) from which a coating has been removed to the side rake (10) of the secondary blade (2) is approximately equal to or less than 5 μm, wherein the cutting edge radius of the main blade (3) is substantially greater than the cutting edge radius at said transition.

2. Cutting blade according to claim 1, wherein the hard material coating is applied by a CVD-process.

3. Cutting blade according to claim 1, characterized in that the hard material has been removed from the chip face (7) of the main blade (3) at least in a region (4), which is adjacent to the chip face (7) of the secondary blade (2).

4. Cutting blade according to claim 1, characterized in that the hard material has been completely removed from the chip face (7) of the secondary blade (2) and the chip face of the main blade (3).

5. Cutting blade according to claim 1, characterized in that the side rakes (10) of the main blade (3) and the secondary blade (2) have been coated with an abrasionresistant hard material.

6. Cutting blade according to claim 1, characterized in that the radius of the cutting edge is smaller in the region of the secondary blade (2) than in the second region (5) of the main blade (3) which is foremost viewed in feed direction.

7. Cutting blade according to claim 1, characterized in that the cutting edge radius of the main blade (3) in a first region (4) immediately adjacent to the secondary blade (2) corresponds approximately to that of the secondary blade (2) and is approximately equal to or less than 5 μm, wherein the first region (4) of the main blade (3) has a very shallow angle of inclination of approximately 3° to the feed direction.

8. Cutting blade according to claim 1, characterized in that the hard material coating consists of titanium nitride.

9. Cutting blade according to claim 1, characterized in that the cutting edge of the main blade (3) encloses an angle of approximately 4° with the feed direction.

10. Process for manufacture of a hard metal cutting blade for machining tools, which is detachably insertable into a slot of a tool head or clamped into the head and which comprises a main and a secondary blade respectively with an associated chip face and adjacent rake, wherein the cutting blade is intended exclusively for finish machining of bores, the main blade being essentially flush with the secondary blade, the secondary blade (2) being inclined counter to the feed direction of the cutting blade (1) and tapering by approximately one μm per 1 mm, comprising coating the cutting blade with a hard material and subsequently grinding the coating off from the chip face (7) in the region of the secondary blade so that a cutting edge radius of approximately equal to or less than 5 μm is obtained in the region of the secondary blade and so that the cutting edge radius of the main blade (3) is substantially greater than the cutting edge radius at said transition.

11. Process according to claim 10, characterized in that the coating is ground off the chip face of the main blade at least in that region which is adjacent to the chip face of the secondary blade.

12. Process according to claim 10 or 11, characterized in that the cutting blade (1) has a width in the region of the chip face prior to the grinding-off of the coating which is approximately 0.05 mm greater than the desired width.

13. Process according to claim 10, wherein the hard material coating is applied by a CVD-process.

* * * * *